United States Patent
Mathison (10) Patent No.: US 10,077,998 B2
(45) Date of Patent: Sep. 18, 2018

(54) HYDROGEN FUELING WITH INTEGRITY CHECKS

(71) Applicant: Honda Motor Co., Ltd., Tokyo (JP)

(72) Inventor: Steven R. Mathison, Torrance, CA (US)

(73) Assignee: Honda Motor Co., Ltd., Tokyo (JP)

( * ) Notice: Subject to any disclaimer, the term of this patent is extended or adjusted under 35 U.S.C. 154(b) by 164 days.

(21) Appl. No.: 15/163,919

(22) Filed: May 25, 2016

(65) Prior Publication Data

US 2017/0074707 A1     Mar. 16, 2017

Related U.S. Application Data (60) Provisional application No. 62/218,010, filed on Sep. 14, 2015.

(51) Int. Cl.
*G01F 22/00* (2006.01)
*G01F 22/02* (2006.01)
(Continued)

(52) U.S. Cl.
CPC ............ *G01F 22/00* (2013.01); *F17C 5/06* (2013.01); *F17C 13/023* (2013.01); *G01F 22/02* (2013.01);
(Continued)

(58) Field of Classification Search
None
See application file for complete search history.

(56) References Cited

U.S. PATENT DOCUMENTS 3,536,109 A    10/1970   Ginsburgh et al.
4,347,472 A    8/1982    Lemelson
(Continued)

FOREIGN PATENT DOCUMENTS

CN     1826492      8/2006
CN     101087975    12/2007
(Continued)

OTHER PUBLICATIONS

Office Action of U.S. Appl. No. 12/982,966 dated Oct. 2, 2013, 26 pages.
(Continued)

*Primary Examiner* — John Kuan
(74) *Attorney, Agent, or Firm* — Rankin, Hill & Clark LLP (57) ABSTRACT

According to one or more aspects, systems and techniques for hydrogen fueling with integrity checks are provided herein. Communicated parameters measured by on-board sensors of a vehicle may be cross-referenced against calculated parameters measured by sensors of a fueling station. For example, communicated parameters relating to a compressed hydrogen storage system (CHSS) tank of a vehicle to be fueled may be received at different time intervals. Calculated parameters may be calculated based on a mass of hydrogen fuel dispensed by a hydrogen fueling station from a reference point to one of the time intervals and densities of the CHSS tank of the vehicle at respective time intervals. An error may be calculated between the communicated parameters and the calculated parameters. A fueling mode, such as a conservative fueling mode or a non-conservative fueling mode, may be determined based on the calculated error.

18 Claims, 6 Drawing Sheets

(51) Int. Cl.
  *F17C 5/06* (2006.01)
  *F17C 13/02* (2006.01)
  *F17C 5/00* (2006.01)

(52) U.S. Cl.
  CPC ...... *F17C 5/007* (2013.01); *F17C 2223/0123* (2013.01); *F17C 2250/032* (2013.01); *F17C 2250/0421* (2013.01); *F17C 2250/0621* (2013.01); *F17C 2260/02* (2013.01); *F17C 2270/0139* (2013.01)

(56) References Cited

U.S. PATENT DOCUMENTS

| | | |
|---|---|---|
| 4,398,172 A | 8/1983 | Carroll et al. |
| 4,490,798 A | 12/1984 | Franks et al. |
| 4,527,600 A | 7/1985 | Fisher et al. |
| 4,934,419 A | 6/1990 | Lamont et al. |
| 5,058,044 A | 10/1991 | Stewart et al. |
| 5,202,617 A | 4/1993 | Nor |
| 5,204,819 A | 4/1993 | Ryan |
| 5,238,030 A | 8/1993 | Miller et al. |
| 5,259,424 A | 11/1993 | Miller et al. |
| 5,327,066 A | 7/1994 | Smith |
| 5,359,522 A | 10/1994 | Ryan |
| 5,479,966 A | 1/1996 | Tison et al. |
| 5,564,306 A | 10/1996 | Miller |
| 5,569,922 A | 10/1996 | Clarke |
| 5,570,729 A | 11/1996 | Mutter |
| 5,594,318 A | 1/1997 | Nor et al. |
| 5,602,745 A | 2/1997 | Atchley et al. |
| 5,628,349 A | 5/1997 | Diggins et al. |
| 5,750,995 A | 5/1998 | Clarke |
| 5,762,118 A | 6/1998 | Epworth et al. |
| 5,868,176 A | 2/1999 | Barajas et al. |
| 5,868,179 A | 2/1999 | Hartsell, Jr. |
| 5,881,779 A | 3/1999 | Kountz et al. |
| 5,956,259 A | 9/1999 | Hartsell, Jr. et al. |
| 5,970,786 A | 10/1999 | Smith et al. |
| 5,971,042 A | 10/1999 | Hartsell, Jr. |
| 6,024,137 A | 2/2000 | Stmad et al. |
| 6,068,030 A | 5/2000 | Tatsuno |
| 6,070,156 A | 5/2000 | Hartsell, Jr. |
| 6,073,081 A | 6/2000 | Hettinger et al. |
| 6,089,284 A | 7/2000 | Kaehler et al. |
| 6,185,501 B1 | 2/2001 | Smith et al. |
| 6,237,647 B1 | 5/2001 | Pong et al. |
| 6,250,347 B1 | 6/2001 | Tatsuno |
| 6,338,008 B1 | 1/2002 | Kohut et al. |
| 6,343,241 B1 | 1/2002 | Kohut et al. |
| 6,381,514 B1 | 4/2002 | Hartsell, Jr. |
| 6,382,269 B1 | 5/2002 | Tatsuno |
| 6,394,150 B1 | 5/2002 | Haimovich et al. |
| 6,401,767 B1 | 6/2002 | Cohen et al. |
| 6,463,967 B1 | 10/2002 | Boyle |
| 6,497,363 B1 | 12/2002 | Kelrich |
| 6,598,792 B1 | 7/2003 | Michot et al. |
| 6,619,336 B2 | 9/2003 | Cohen et al. |
| 6,672,340 B2 | 1/2004 | Mutter |
| 6,688,342 B2 | 2/2004 | Lewis |
| 6,708,573 B1 | 3/2004 | Cohen et al. |
| 6,727,809 B1 | 4/2004 | Smith |
| 6,745,801 B1 | 6/2004 | Cohen et al. |
| 6,822,551 B2 | 11/2004 | Li et al. |
| 6,964,821 B2 | 11/2005 | Hirakata |
| 7,059,364 B2 | 6/2006 | Kountz et al. |
| 7,171,989 B2 | 2/2007 | Corless et al. |
| 7,406,987 B2 | 8/2008 | Takano et al. |
| 7,412,994 B2 | 8/2008 | Corless et al. |
| 7,523,770 B2 | 4/2009 | Horowitz et al. |
| 7,543,611 B2 | 6/2009 | Kaellberg |
| 7,647,194 B1 | 1/2010 | Casey et al. |
| 7,671,482 B2 | 3/2010 | Tighe |
| 7,820,313 B2 | 10/2010 | Winkler |
| 7,921,883 B2 | 4/2011 | Perry et al. |
| 8,360,112 B2 | 1/2013 | Allidieres et al. |
| 8,517,062 B2 | 8/2013 | Allidieres et al. |
| 8,783,303 B2 | 7/2014 | Harty et al. |
| 2005/0103400 A1 | 5/2005 | Eichelberger et al. |
| 2005/0178463 A1 | 8/2005 | Kountz et al. |
| 2007/0079892 A1 | 4/2007 | Cohen et al. |
| 2007/0090937 A1 | 4/2007 | Stabler |
| 2008/0000542 A1 | 1/2008 | Cohen et al. |
| 2008/0185068 A1 | 8/2008 | Cohen et al. |
| 2008/0231836 A1 | 9/2008 | Curello et al. |
| 2008/0289720 A1 | 11/2008 | Takano et al. |
| 2009/0044877 A1 | 2/2009 | Faudou et al. |
| 2009/0107577 A1 | 4/2009 | Allidieres et al. |
| 2009/0205745 A1 | 8/2009 | Farese et al. |
| 2010/0121551 A1 | 5/2010 | Boss et al. |
| 2010/0185360 A1 | 7/2010 | Windbergs et al. |
| 2010/0241470 A1 | 9/2010 | Smith |
| 2010/0294393 A1 | 11/2010 | Allidieres et al. |
| 2010/0307636 A1 | 12/2010 | Uemura et al. |
| 2011/0035049 A1 | 2/2011 | Barrett |
| 2011/0100507 A1 | 5/2011 | Weitzhandler et al. |
| 2011/0259469 A1 | 10/2011 | Harty et al. |
| 2012/0192989 A1 | 8/2012 | Schulze |
| 2012/0267002 A1 | 10/2012 | Kittilsen et al. |
| 2014/0202584 A1* | 7/2014 | Mathison ................ F17C 5/007 141/4 |

FOREIGN PATENT DOCUMENTS

| | | |
|---|---|---|
| DE | 19643801 | 5/1998 |
| EP | 0653585 | 5/1995 |
| EP | 1205704 | 5/2002 |
| EP | 2093475 | 8/2009 |
| EP | 1831598 | 1/2011 |
| WO | 2007077376 | 7/2007 |

OTHER PUBLICATIONS

International Search Report and Written Opinion of PCT/US2014/022935 dated Jul. 9, 2014, 10 pages.

Search Report of CN Application No. 2011800308318 dated Jan. 10, 2014, 4 pages.

Office Action of U.S. Appl. No. 14/280,550 dated Sep. 8, 2015, 28 pages.

Office Action of U.S. Appl. No. 13/832,311 dated Oct. 7, 2015, 27 pages.

Office Action of U.S. Appl. No. 14/300,229 dated Dec. 18, 2015, 34 pages.

* cited by examiner

HYDROGEN FUELING WITH INTEGRITY CHECKS

CROSS REFERENCE TO RELATED APPLICATIONS

This application claims the benefit of U.S. Provisional Patent Application, Ser. No. 62/218,010 entitled "HYDROGEN FUELING INTEGRITY CHECKS", filed on Sep. 14, 2015 and is related to U.S. Non-Provisional patent application Ser. No. 14/725,099 entitled "METHOD AND SYSTEM FOR TANK REFILLING USING ACTIVE FUELING SPEED CONTROL", filed on May 29, 2015; the entirety of the above-noted application(s) is incorporated by reference herein.

BACKGROUND

During communication refueling of a Compressed Hydrogen Storage System (CHSS), data, such as temperature and pressure information, tank type, tank size, number of tanks associated with a vehicle, etc. may be transmitted to a hydrogen tank filling station via a communication interface, such as an Infrared Data Association (IRDA) interface, for example. This full-communication fueling is generally beneficial in that the transmitted, real-time data may be used to facilitate quicker, efficient, and safer fueling. However, while full-communication fueling can be used to provide this parametric data to the hydrogen tank filling station, the possibility exists that in-tank sensors aboard the vehicle may fail, thereby resulting in faulty information or data being transmitted.

BRIEF DESCRIPTION

According to one or more aspects, a system for hydrogen fueling with integrity checks is provided, including a communication component, a calculation component, an error component, and a controller. The communication component may receive one or more communicated parameters at one or more time intervals. One or more of the communicated parameters may relate to a compressed hydrogen storage system (CHSS) tank of a vehicle to be fueled with hydrogen fuel. The calculation component may calculate one or more calculated parameters related to the CHSS tank of the vehicle based on a mass of hydrogen fuel dispensed by a hydrogen fueling station from a reference point to one or more of the time intervals and one or more densities of the CHSS tank of the vehicle at one or more of the time intervals. The error component may calculate a tank volume error based on one or more of the communicated parameters and one or more of the calculated parameters at one or more of the time intervals. The controller may determine one or more fueling modes for the hydrogen fueling station based on the tank volume error.

According to one or more aspects, a method for hydrogen fueling with integrity checks is provided. The method may include receiving one or more communicated parameters at one or more time intervals, wherein one or more of the communicated parameters relates to a compressed hydrogen storage system (CHSS) tank of a vehicle to be fueled with hydrogen fuel, calculating one or more calculated parameters related to the CHSS tank of the vehicle based on a mass of hydrogen fuel dispensed by a hydrogen fueling station from a reference point to one or more of the time intervals and one or more densities of the CHSS tank of the vehicle at one or more of the time intervals, calculating a tank volume error based on one or more of the communicated parameters and one or more of the calculated parameters at one or more of the time intervals, and determining one or more fueling modes for the hydrogen fueling station based on the tank volume error.

According to one or more aspects, a system for hydrogen fueling with integrity checks is provided, including a communication component, a calculation component, an error component, and a controller. The communication component may receive one or more communicated parameters at one or more time intervals. One or more of the communicated parameters may relate to a compressed hydrogen storage system (CHSS) tank of a vehicle to be fueled with hydrogen fuel. The calculation component may calculate one or more calculated parameters related to the CHSS tank of the vehicle based on a mass of hydrogen fuel dispensed by a hydrogen fueling station from a reference point to one or more of the time intervals and one or more densities of the CHSS tank of the vehicle at one or more of the time intervals. The error component may calculate a tank volume error based on one or more of the communicated parameters and one or more of the calculated parameters at one or more of the time intervals. The controller may determine a conservative fueling mode or a non-conservative fueling mode for the hydrogen fueling station based on the tank volume error.

DETAILED DESCRIPTION

Different systems or methods, techniques, filling models, or associated algorithms may be implemented by a hydrogen tank filling station or during a gas tank filling operation which promote efficiency, accuracy, or safety during a refueling operation. For example, during a communication (e.g., non-conservative) fueling mode, parametric data or other tank related parameters may be measured by sensors on-board a vehicle undergoing refueling of a Compressed Hydrogen Storage System (CHSS) tank and communicated to the hydrogen tank filling station. This information may be used to determine a fueling speed, a pressure ramp rate, or control one or more aspects of the hydrogen fueling process.

However, because the possibility exists that the sensors on-board the vehicle may malfunction or provide erroneous readings, the hydrogen tank filling station may measure data (e.g., from the standpoint of a system 100 for hydrogen fueling with integrity checks) and calculate corresponding tank related parameters to verify the 'correctness' of the tank related parameters communicated from the vehicle. Typically, hydrogen fueling stations have redundancies for measurements, such as pressure measurements, while temperature sensors on the vehicle, for example, may not have such redundancies.

For example, if the vehicle equipped with a CHSS fuel system has a multi-tank system and one of the tank valves for the multi-tank system is closed, the tank volume may be only half of what the vehicle reports or communicates. Thus, the system 100 for hydrogen fueling with integrity checks would be configured to detect such incorrect information and fuel the vehicle accordingly.

Regardless, communicated parameters may be cross-referenced against corresponding calculated parameters, and an error parameter may be calculated therefrom. If the error parameter exceeds an error threshold, the hydrogen tank filling station may fuel the vehicle according to a conservative fueling mode to mitigate overfilling or overheating of the hydrogen tank, thereby providing an 'integrity check' for the communicated parameters during the hydrogen fueling process.

Figure 1:
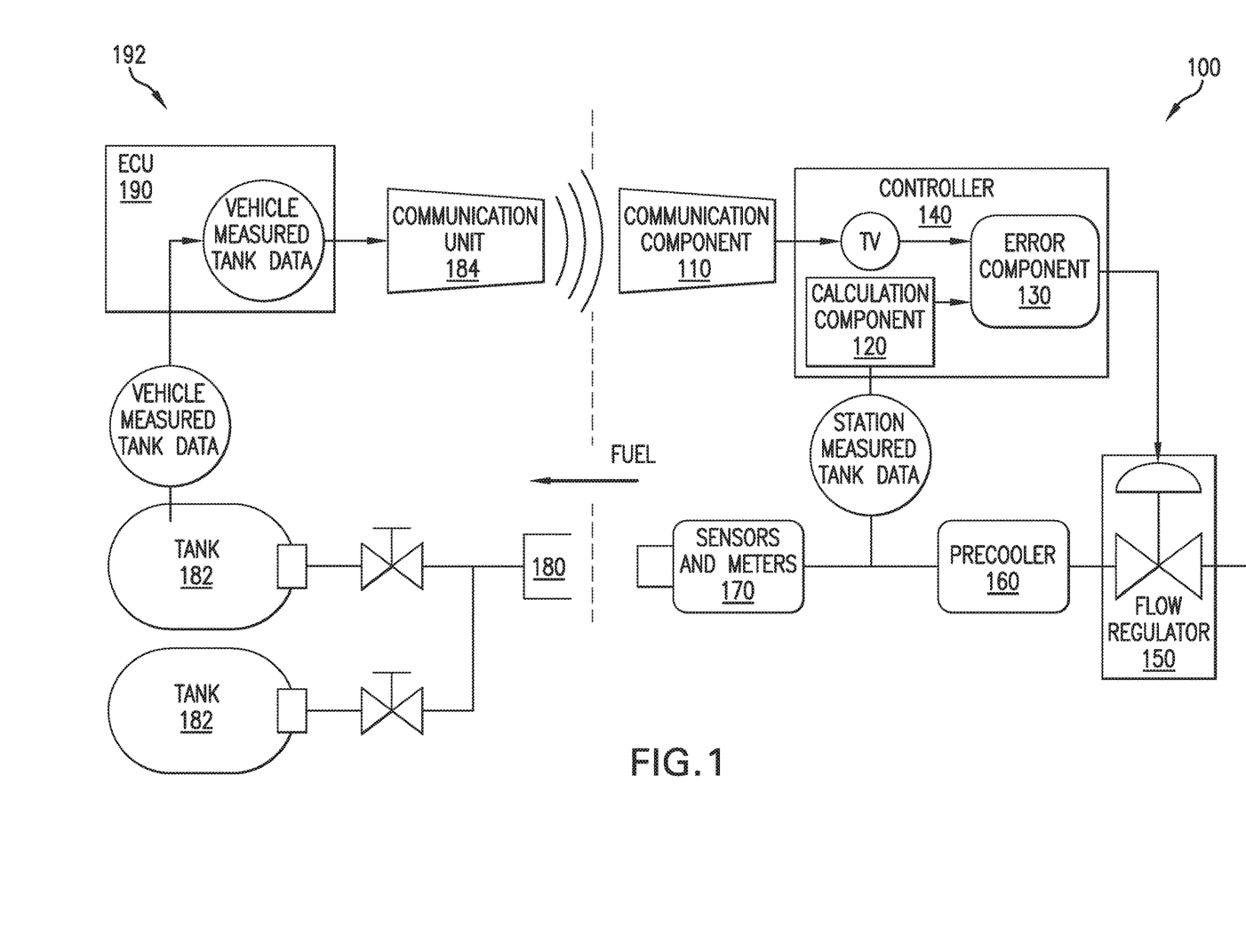
FIG. 1 is an illustration of an example component diagram of a system for hydrogen fueling with integrity checks, according to one or more embodiments.

FIG. 1 is an illustration of an example component diagram of the system 100 for hydrogen fueling with integrity checks, according to one or more embodiments. The system 100 for hydrogen fueling with integrity checks may include a communication component 110, a calculation component 120, an error component 130, a controller 140, a flow regulator 150, a precooler 160, and one or more sensors 170 (e.g., which may be in a nozzle of a fuel dispenser). The system 100 may be implemented in a hydrogen fueling station which provides hydrogen fuel or gas to a vehicle 192.

The vehicle 192 may include a fuel inlet 180, one or more Compressed Hydrogen Storage System (CHSS) tank(s) 182, corresponding on-board sensors, a communication unit 184, and an electronic control unit (ECU) 190. The on-board sensors of the vehicle 192 may measure one or more parameters associated with the CHSS tank(s) 182 (e.g., illustrated as vehicle measured tank data stored in the ECU 190 of the vehicle 192) and the communication unit 184 of the vehicle 192 may communicate this data or these parameters to the system 100 for hydrogen fueling with integrity checks. Because the system 100 implements integrity checks, these communicated parameters are not necessarily taken at face value. Rather, the system 100 for hydrogen fueling with integrity checks calculates one or more calculated parameters related to the CHSS tank(s) 182 of the vehicle 192 and cross-references the communicated parameters with the calculated parameters.

In this regard, the communication component 110 may receive one or more communicated parameters from the communication unit 184 of the vehicle 192 being filled or fueled with hydrogen at one or more time intervals. These communicated parameters may be related to the CHSS tank(s) 182 of the vehicle 192 and be vehicle measured (e.g., by on-board sensors on the vehicle 192). Examples of communicated parameters may include a communicated tank volume of one or more or all of the CHSS tanks ($TV_{IR}$), pressure information, temperature information, such as the gas temperature of the CHSS gas ($MT_{IR}$), mass flow rate, etc. In one or more embodiments, the communication component 110 may receive communicated parameters through an Infrared Data Association (IRDA) interface or through infrared (IR) communications implemented by the communication unit 184 of the vehicle 192. The communication component 110 may include a communicator, a dedicated short-range communications (DSRC) unit, a transceiver, transmitter, receiver, etc.

The calculation component 120 may calculate one or more calculated parameters also related to the CHSS tank(s) 182 of the vehicle 192. The calculation component 120 may perform one or more of the calculations based on parameters which are station measured by sensors 170 of the system 100 for hydrogen fueling with integrity checks. For example, the sensors 170 may measure a mass of hydrogen fuel dispensed by a hydrogen fueling station from a reference point to one or more of the time intervals and one or more densities of the CHSS tank(s) 182 of the vehicle 192 at the corresponding time intervals. In this example, the sensors 170 may include a mass flow meter.

In other words, the sensors 170 may measure an initial density of the CHSS tank(s) 182 of the vehicle 192 and another density at a point later in the filling or fueling process. In any event, the sensors 170 may receive measurements (made station side or system 100 side) which enable the calculation component 120 to calculate a first density at a first time, a second density at a second time (e.g., a density from a reference point), and a mass of fuel dispensed between the first time and the second time. Based on this, the calculation component 120 may determine how much mass was dispensed over a known period of time and the calculated tank volume may be determined therefrom.

Although tank volume is discussed as being the parameter which is cross referenced, other parameters received by the communication component 110 may be checked by the calculation component 120 based on measurements by one or more of the sensors 170 of the system 100 for hydrogen fueling with integrity checks.

In one or more embodiments, the calculation component 120 may utilize one or more of the following equations to determine the calculated tank volume or other calculated parameters:
Generally:

$$TV_{calc} = \frac{m}{(\sigma - \sigma_0)}$$

calculated CHSS tank volume $$m = \int_0^t \dot{m} dt$$

mass dispensed by the hydrogen fueling station from reference point 0 to time t (e.g., measured by sensors 170)

$$\sigma = f(P_{disp}, MT_{IR})$$

density of the CHSS tank when $\dot{m}=0$ $$TV_{error} = 100 * \frac{(TV_{calc} - TV_{IR})}{TV_{IR}}$$

calculated CHSS tank volume error
$P_{disp}$=pressure at a hydrogen dispenser of the hydrogen fueling station (e.g., measured by sensors 170)
$MT_{IR}$=measured temperature communicated or a type of communicated parameter
After connection pulse:

$$\sigma_0 = f(P_{disp(0)}, MT_{IR(0)})$$

(after connection pulse)

After leak check:

$$\sigma_{lc} = f(P_{disp(lc)}, MT_{IR(lc)}) \quad \text{(after each leak check)}$$

$$TV_{calc} = \frac{m}{(\sigma_{lc} - \sigma_0)} \quad \text{(after each leak check)}$$

$$TV_{error} = 100 * \frac{(TV_{calc} - TV_{IR})}{TV_{IR}} \quad \text{(after each leak check)}$$

$$m = \int_0^t \dot{m}\, dt$$

IF $TV_{error}$ <=tank volume error threshold
THEN SET ICRR=FALSE
ELSE SET ICRR=TRUE
For lookup table based protocol:

$$FPRR_{target} = \frac{(P_{final\ target} - P_1)}{\left(\frac{1}{APRR_{final}} * (P_{final\ target} - P_0) - t_{stationfallback}\right)}$$

(If $t_{stationfallback}$ is in seconds, it should be divided by 60.)
For MC based protocol:
Initialize $t_{final\ min}$ parameters:
  IF $P_{initial}$<5 MPa, THEN
    $T_{final\ min\ A}$=155
    $T_{final\ min\ B}$=155
    $T_{final\ min\ C}$=222
    $T_{final\ min\ cons}$=222
  ELSE IF $P_{initial}$>=5 MPa, THEN
    $T_{final\ min\ A}$=147
    $T_{final\ min\ B}$=147
    $T_{final\ min\ C}$=210
    $T_{final\ min\ cons}$=210
Calculate interpolated tfinal coefficients for boundary tanks:

$$a_{tank\ size} = a_{tank\ size(Tamb\_below)} + \frac{(a_{tank\ size(Tamb\_above)} - a_{tank\ size(Tamb\_below)}) * (T_{amb} - T_{amb\_below})}{(T_{amb\_above} - T_{amb\_below})}$$

$$b_{tank\ size} = b_{tank\ size(Tamb\_below)} + \frac{(b_{tank\ size(Tamb\_above)} - b_{tank\ size(Tamb\_below)}) * (T_{amb} - T_{amb\_below})}{(T_{amb\_above} - T_{amb\_below})}$$

$$c_{tank\ size} = c_{tank\ size(Tamb\_below)} + \frac{(c_{tank\ size(Tamb\_above)} - c_{tank\ size(Tamb\_below)}) * (T_{amb} - T_{amb\_below})}{(T_{amb\_above} - T_{amb\_below})}$$

$$d_{tank\ size} = d_{tank\ size(Tamb\_below)} + \frac{(d_{tank\ size(Tamb\_above)} - d_{tank\ size(Tamb\_below)}) * (T_{amb} - T_{amb\_below})}{(T_{amb\_above} - T_{amb\_below})}$$

Where tank size may be 49.7 liters, 99.4 liters, 174.0 liters, 248.6 liters, etc.
Tanks ranging from 49.7 liters to 99.4 liters fall under CHSS capacity category A.
Tanks ranging from 99.4 liters to 174.0 liters fall under CHSS capacity category B.
Tanks ranging from 174.0 liters to 248.6 liters fall under CHSS capacity category C.

$$t_{final\ tank\ size} = *\beta*\theta*[a_{tank\ size}*(MAT_C)^3 + b_{tank\ size}*(MAT_C)^2 + c_{tank\ size}*(MAT_C) + d_{tank\ size}]$$

Where tank size may be 49.7 liters, 99.4 liters, 174.0 liters, 248.6 liters, etc.

Thus, $t_{final}$ is calculated for each boundary tank by the calculation component 120. If the ICRR flag=FALSE, then the calculation component 120 calculates a $t_{final\ small}$ and a $t_{final\ large}$ based on the communicated parameters (e.g., the CHSS capacity category or communicated tank volume).
$t_{final}$ calculations:
IF $CHSS_{capacity\ category}$=A, $t_{final\ small}$=$t_{final\ 49.7}$, $t_{final\ large}$=$t_{final\ 99.4}$, $t_{final\ min}$=$t_{final\ min\ A}$
IF $CHSS_{capacity\ category}$=B, $t_{final\ small}$=$t_{final\ 99.4}$, $t_{final\ large}$=$t_{final\ 174.0}$, $t_{final\ min}$=$t_{final\ min\ B}$
IF $CHSS_{capacity\ category}$=C, $t_{final\ small}$=$t_{final\ 174.0}$, $t_{final\ large}$=$t_{final\ 248.6}$, $t_{final\ min}$=$t_{final\ min\ C}$
IF ICRR flag=FALSE, $t_{final}$=MAXIMUM ($t_{final\ small}$, $t_{final\ large}$, $t_{final\ min}$)
IF ICRR flag=TRUE, $t_{final}$=MAXIMUM ($t_{final\ min\ cons}$, $t_{final\ 49.7}$, $t_{final\ 99.4}$, $t_{final\ 174.0}$, $t_{final\ 248.6}$)
Pressure limit calculations:

IF ICRR flag=TRUE,$P_{limit-comm}$=MINIMUM[83.5, 0.2793*$T_{cold}$−2.63]

IF ICRR flag=FALSE,$P_{limit-comm}$=MINIMUM[83.5, 0.3114*$T_{cold}$−2.92]

The error component 130 may compare the calculated tank volume against the communicated tank volume to determine a tank volume error at one or more of the time intervals, such as leak check intervals (σ). The tank volume error may be utilized to perform an integrity check to determine if the volume communicated to the system 100 for hydrogen fueling with integrity checks is accurate or within a tank volume error threshold. In this way, the error component 130 may calculate the tank volume error based on the calculated tank volume and the communicated tank volume (e.g., which may be received directly by the communication component 110 or calculated based on other communicated parameters received by the communication component 110).

The calculation component 120 and the error component 130 may be implemented as a processor, a processing unit, a memory, or circuitry which performs one or more calculations, such as calculating one or more of the calculated parameters related to the CHSS tank of the vehicle or calculating the tank volume error.

The controller 140 may determine a fueling mode which ensures that 'safe' assumptions (and corresponding variables used for fueling) are being made within a fueling protocol or for fueling speed calculations (e.g., since fueling speed or pressure ramp rates may be based on the tank volume). For example, the controller 140 may determine whether the tank volume error (e.g., calculated by the error component 130) meets criteria, such as being less than the tank volume error threshold. The controller 140 may include an integrated circuit board or may be an electronic control unit (ECU) of a vehicle, according to one or more embodiments.

If the tank volume error is less than the tank volume error threshold, the controller 140 may proceed with fueling in a communication mode according to the communicated tank volume or one or more other communicated parameters or data. In other words, if the tank volume error is less than the tank volume error threshold, the controller 140 may assume that information being communicated from the vehicle 192 is accurate or 'trusted' and that no vehicle sensors are malfunctioning, and commence fueling according to the communication fueling mode (e.g., MC Method, MC Default Fill, other table based fueling protocol, etc.). Thus, if the tank volume error is less than the tank volume error threshold, the communicated parameters may be assumed to be correct, and thus utilized in average pressure ramp rate (APRR) or $t_{final}$ calculations (e.g., predicted fill time). The hydrogen fueling station or system 100 may use an APRR, $t_{final}$ value, or other lookup value from the MC Method, the MC Default Fill, or other lookup table (LT) based fueling protocol according to the communicated tank volume, thereby speeding up fueling by entering the communication fueling mode.

Conversely, if the tank volume error is more than the tank volume error threshold, the controller 140 may select a conservative fueling mode (e.g., until the next leak check or time interval). In this way, the controller 140 may have the system 100 fuel according to a conservative or 'safe' mode which does not utilize or rely on communicated parameters.

In the conservative mode, the controller 140 may search a database or one or more lookup tables for fueling speeds or APRRs across all tank categories, and use the most conservative fueling speeds or APRRs. As used herein, 'conservative' means that when different values of a lookup table are possible, selecting the slowest, safest value. In other words, selecting the lengthiest $t_{final}$ value (e.g., a predetermined conservative fill time) or the smallest APRR value, for example. Further, in the conservative mode, no communicated parameters are utilized to influence fueling. Thus, if the tank volume error is greater than the tank volume error threshold, the communicated parameters may be assumed to be incorrect, and the APRR or $t_{final}$ calculations may utilize the most conservative APRR or $t_{final}$ values which are found (e.g., from lookup tables).

Generally, lookup tables are used to look up fueling speeds or APRRs which are appropriate for a given scenario. For example, according to the MC Default Fill, different tank volume categories (e.g., 2 kg to 4 kg, 4 kg to 7 kg, 7 kg to 10 kg, etc.) may be used to look up different pressure ramp rates according to the appropriate tank volume category the vehicle CHSS falls under. Particularly, the MC Default Fill has different coefficient maps for the $t_{final}$ value based on the tank volume.

Figure 3:
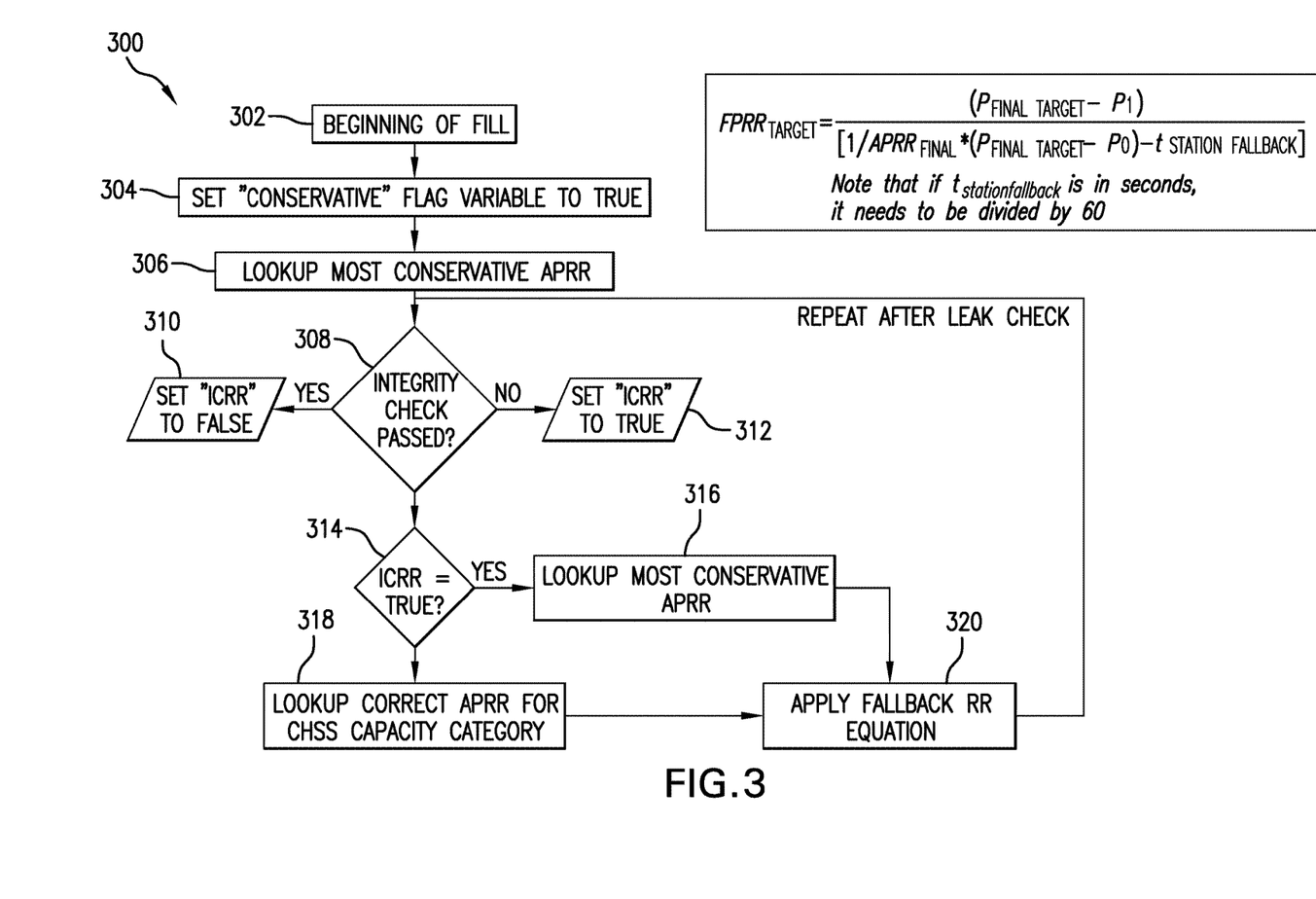
FIG. 3 is an illustration of an example flow diagram of a method for hydrogen fueling with integrity checks, according to one or more embodiments.
Figure 4:
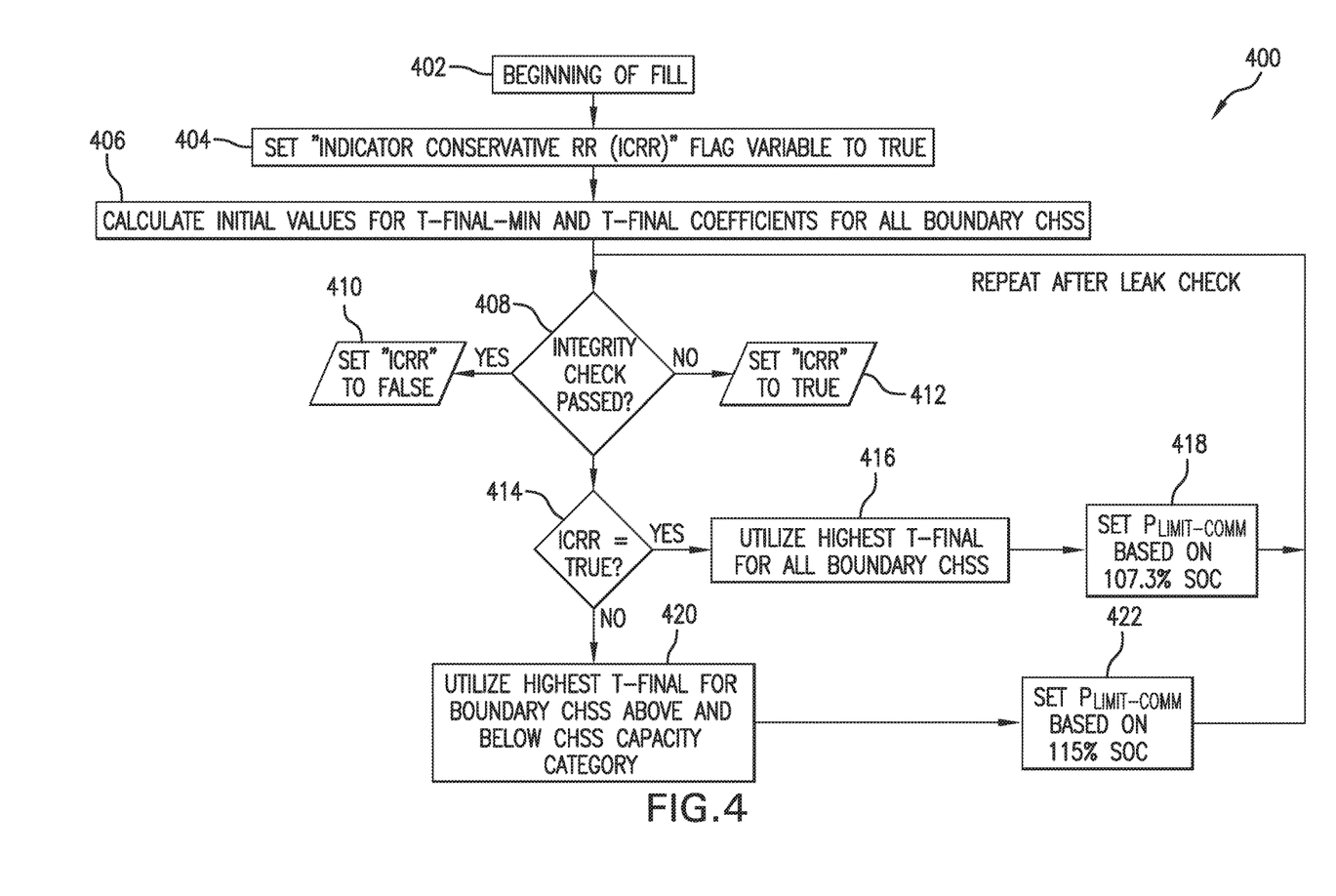
FIG. 4 is an illustration of an example flow diagram of a method for hydrogen fueling with integrity checks, according to one or more embodiments.

Generally, the controller 140 is configured to begin or initiate a fill or the fueling process with the assumption that the communicated tank volume or other communicated information is incorrect. In other words, the controller 140 may assume that the sensors of the vehicle 192 are malfunctioning or defective until proven otherwise, thereby promoting a safer fill. Stated another way, the system 100 may not necessarily begin the fueling process using the communicated tank volume or other information communicated by the vehicle 192. In this way, the controller 140 starts the fueling process in the conservative mode, as seen in FIGS. 3 and 4.

Because the tank volume error may be computed at numerous check intervals, the system 100 for hydrogen fueling with integrity checks may begin in the conservative mode, switch to another fueling mode (e.g., the communication fueling mode), and back to the conservative mode. In other words, a switch to communication fueling mode does not necessarily mean that the system 100 will remain in communication fueling mode, thereby continuously ensuring that communicated data is accurate and adding an additional level of safety to fueling. Explained yet another way, if one or more of the communicated parameters (e.g., temperature, mass flow, tank volume) are determined to be incorrect, the system 100 may proceed with fueling cautiously or conservatively according to the conservative mode.

Although FIG. 1 shows that the calculation component 120 and the error component 130 are sub-components of the controller 140, other embodiments or implementations may have respective components implemented individually rather than as sub-components.

The flow regulator 150 may adjust the rate or speed of fueling based on input from the controller 140 (e.g., depending on the fueling mode being the conservative fueling mode or the non-conservative fueling mode), such as according to a selected $t_{final}$ value or an APRR value.

Figure 2:
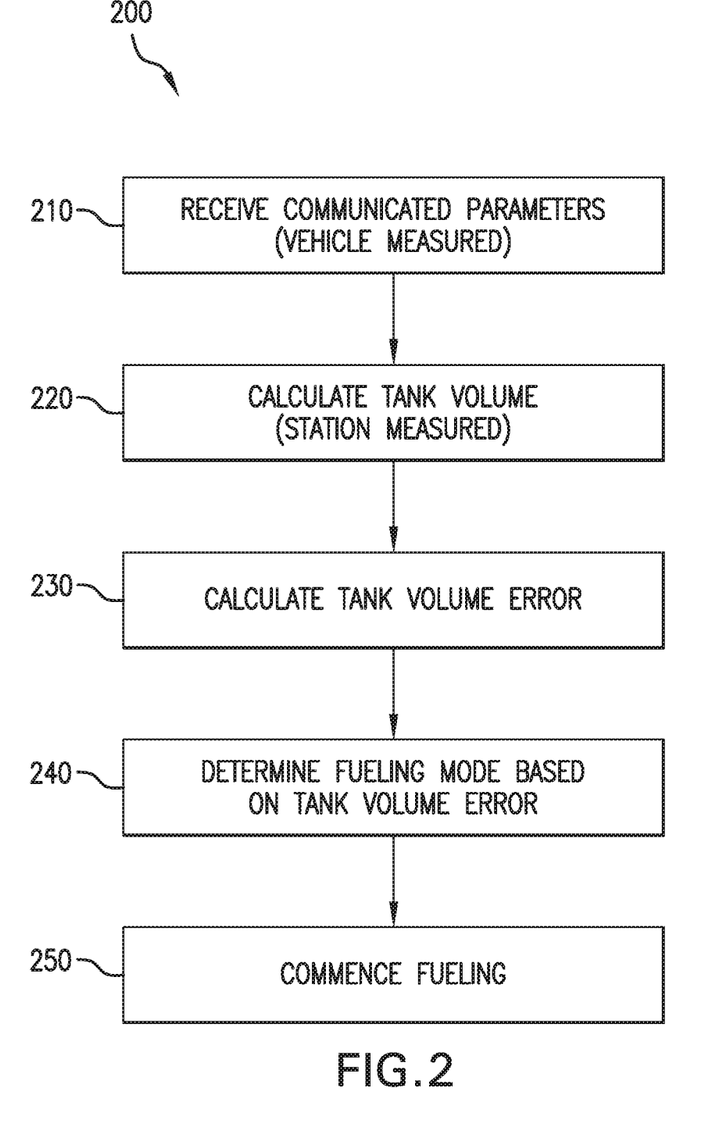
FIG. 2 is an illustration of an example flow diagram of a method for hydrogen fueling with integrity checks, according to one or more embodiments.

FIG. 2 is an illustration of an example flow diagram of a method 200 for hydrogen fueling with integrity checks, according to one or more embodiments. The method 200 may include receiving communicated parameters (e.g., vehicle measured parameters or tank data) 210. The communicated parameters may include a communicated tank volume or be used to calculate the tank volume. The method 200 may include calculating a tank volume (e.g., using station measured parameters) 220. The tank volume error may be calculated at one or more time intervals, such as at one or more leak check intervals (e.g., every 20 MPa). The method 200 may include calculating a tank volume error based on the communicated parameters and the calculated tank volume 230, determining a fueling mode based on the tank volume error 240, and fueling according to the determined fueling mode 250.

In one or more embodiments, the method 200 for hydrogen fueling with integrity checks may include initiating fueling in a conservative mode, using a largest $t_{final}$ value or smallest APRR from a set of lookup tables across a plurality of tank volume possibilities. Further, as a result of determining the fueling mode, switching fueling modes, such as from conservative mode to a non-conservative fueling mode (or vice versa) may occur. When switching from conservative to a non-conservative mode, a fall forward ramp rate equation may be implemented when fueling is performed according to lookup tables (and not the MC Method or MC Default Fill). Conversely, when switching from non-conservative mode to conservative mode, a fall back ramp rate equation may be implemented when fueling is performed according to lookup tables (and not the MC Method or MC Default Fill).

FIG. 3 is an illustration of an example flow diagram of a method 300 for hydrogen fueling with integrity checks, according to one or more embodiments where a table based fill protocol is being implemented. At 302, the fill begins. At 304, an "Indicator Conservative Ramp Rate" (ICRR) flag variable is set to TRUE, resulting in filling or fueling according to a conservative mode. Because of this, a most conservative APRR is looked up at 306. Although APRR is described here, other variables may be utilized, such as the most conservative $t_{final}$ and the like. At 308, a determination is made as to whether an integrity check has been passed. In other words, block 308 may correspond to one or more portions of the method 200 of FIG. 2. For example, if the tank volume error of block 240 of the method 200 is less than a threshold tank volume error, the "ICRR" flag is set to FALSE at 310 in the method 300, thereby causing the fill to be performed in a non-conservative mode.

Conversely, if the tank volume error of block 240 of the method 200 is greater than the threshold tank volume error, the "ICRR" flag is set to TRUE at 312, thereby causing the next portion of the fill to be performed in the conservative mode (e.g., using a conservative APRR, etc.). This can be seen at block 314, where a determination is made as to whether the "ICRR" flag=TRUE. If so, the most conservative APRR is looked up 316 and used. If not, a corresponding APRR may be looked up for a CHSS tank volume category at 318. At 320, a fallback or fall forward ramp rate equation may be applied until the next or following leak check.

Fallback or fall forward ramp rate equations may be utilized to compensate for filling which was too quick (e.g., fueling during communication fueling mode and failing the integrity check thereafter) or unnecessarily slow (e.g., fueling during conservative mode and passing the integrity check thereafter). Thus, a fall back ramp rate equation would decrease the ramp rate, while the fall forward ramp rate equation would increase the ramp rate.

In other words, the fall back and fall forward ramp rate equations compensate for the fact that the APRR represents how fast filling should occur over the whole fill based on starting at some minimum pressure and ending at some maximum pressure. Because a portion of the fill has already occurred when the mode is switched from conservative to communication fueling or vice versa, if the fill has been started in conservative mode and at a check interval, it is confirmed that the tank volume is less than the criteria or threshold, the fill should be sped up based on the correct APRR. However, it is possible to fill or fuel the vehicle slightly faster than that APRR because the fill occurred more slowly than necessary during the conservative mode portion of the fill. Thus, the fall forward ramp rate equation here would account for the slower portion of the fill and provide a ramp rate slightly faster than the actual APRR.

However, because this is already considered in the MC protocol, fallback and fall forward ramp rates are not required as a separate step when performing fueling using the MC protocols. Thus, for a system 100 which employs the MC Method or the MC Default Fill, when the controller 140 determines that the tank volume error is less than the tank volume error threshold, a corresponding $t_{final}$ is calculated using the communicated tank volume, coefficients corresponding $t_{final}$ are looked up, and fueling proceeds according to the communicated parameters or corresponding values.

In this regard, FIG. 4 is an illustration of an example flow diagram of a method 400 for hydrogen fueling with integrity checks, according to one or more embodiments where an MC protocol (e.g., the MC Default Fill, the MC Method, or other MC protocol described in U.S. Patent Publication 20150308621 A1) is being implemented. At 402, the fill begins. At 404, the "Indicator Conservative Ramp Rate" (ICRR) flag variable is set to TRUE, resulting in filling or fueling according to a conservative mode. At 406, initial values for $t_{final-min}$ and $t_{final}$ coefficients are calculated for a boundary CHSS. At 408, a determination is made as to whether an integrity check has been passed.

Similarly to FIG. 3, block 408 may correspond to one or more portions of the method 200 of FIG. 2. For example, if the tank volume error of block 240 of the method 200 is less than a threshold tank volume error, the "ICRR" flag is set to FALSE at 410 in the method 400, thereby causing the fill to be performed in a non-conservative mode. Conversely, if the tank volume error of block 240 of the method 200 is greater than the threshold tank volume error, the "ICRR" flag is set to TRUE at 412, thereby causing the next portion of the fill to be performed in the conservative mode (e.g., using a conservative APRR, etc.).

In conservative mode, the fueling is performed at the slowest speed found across all of the different scenarios, thereby ensuring a 'safe' fill. As an example, in the conservative mode (when an integrity check fails at 408 by having a tank volume error which exceeds a tank volume error threshold, causing the "ICRR" flag to be TRUE), the highest $t_{final}$ value among all of the tank volume categories would be selected because that would result in the longest (and safest or most conservative) fill time.

This can be seen at block 414, where a determination is made as to whether the "ICRR" flag=TRUE or tank volume error is greater than the tank volume error threshold, this could indicate an error in the MT signal. If so, the highest, longest, or greatest $t_{final}$ value is used for the boundary CHSS at 416. Thereafter, at 418, the $P_{limit-comm}$ is set based on a 107.3% state of charge (SOC) rather than the typical 115% SOC using P-station and MC T-cold. If ICRR=FALSE, the highest, longest, or greatest $t_{final}$ value for the boundary CHSS above and below the CHSS capacity category at 420 is used. At 422, the $P_{limit-comm}$ is set based on a 115% SOC (until the next or following leak check). In this way, the tank volume error may be used to set the pressure limit for non-conservative mode or communication fueling.

Figure 5:
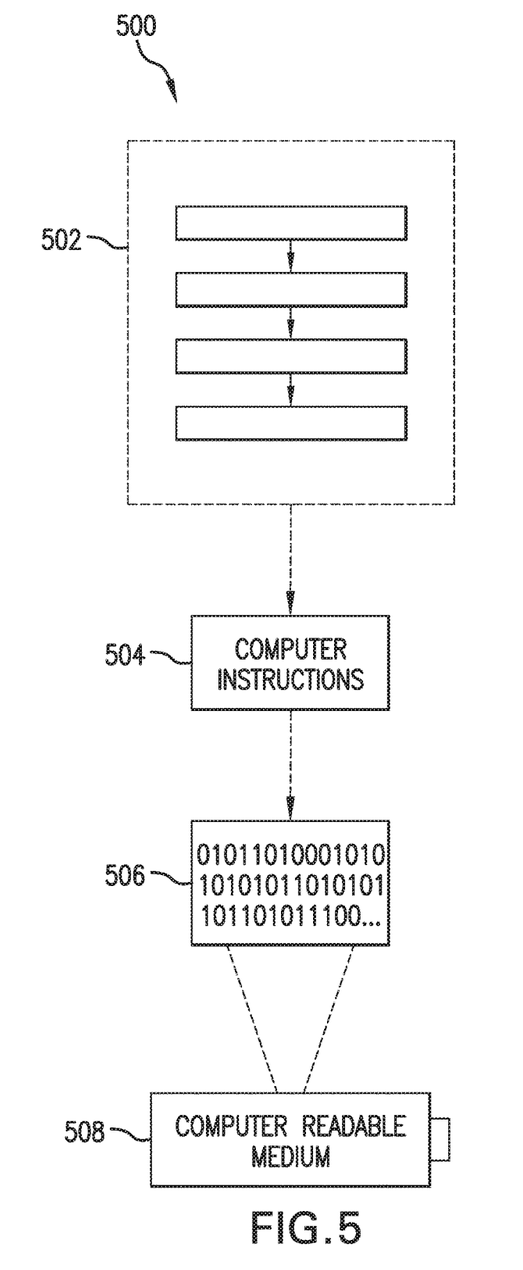
FIG. 5 is an illustration of an example computer-readable medium or computer-readable device including processor-executable instructions configured to embody one or more of the provisions set forth herein, according to one or more embodiments.

Still another embodiment involves a computer-readable medium including processor-executable instructions configured to implement one or more embodiments of the techniques presented herein. An embodiment of a computer-readable medium or a computer-readable device devised in these ways is illustrated in FIG. 5, wherein an implementation 500 includes a computer-readable medium 508, such as a CD-R, DVD-R, flash drive, a platter of a hard disk drive, etc., on which is encoded computer-readable data 506. This computer-readable data 506, such as binary data including a plurality of zero's and one's as shown in 506, in turn includes a set of computer instructions 504 configured to operate according to one or more of the principles set forth herein. In one such embodiment 500, the processor-executable computer instructions 504 may be configured to perform a method 502, such as the method 200 of FIG. 2, the method 300 of FIG. 3, or the method 400 of FIG. 4. In another embodiment, the processor-executable instructions 504 may be configured to implement a system, such as the system 100 of FIG. 1. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 6:
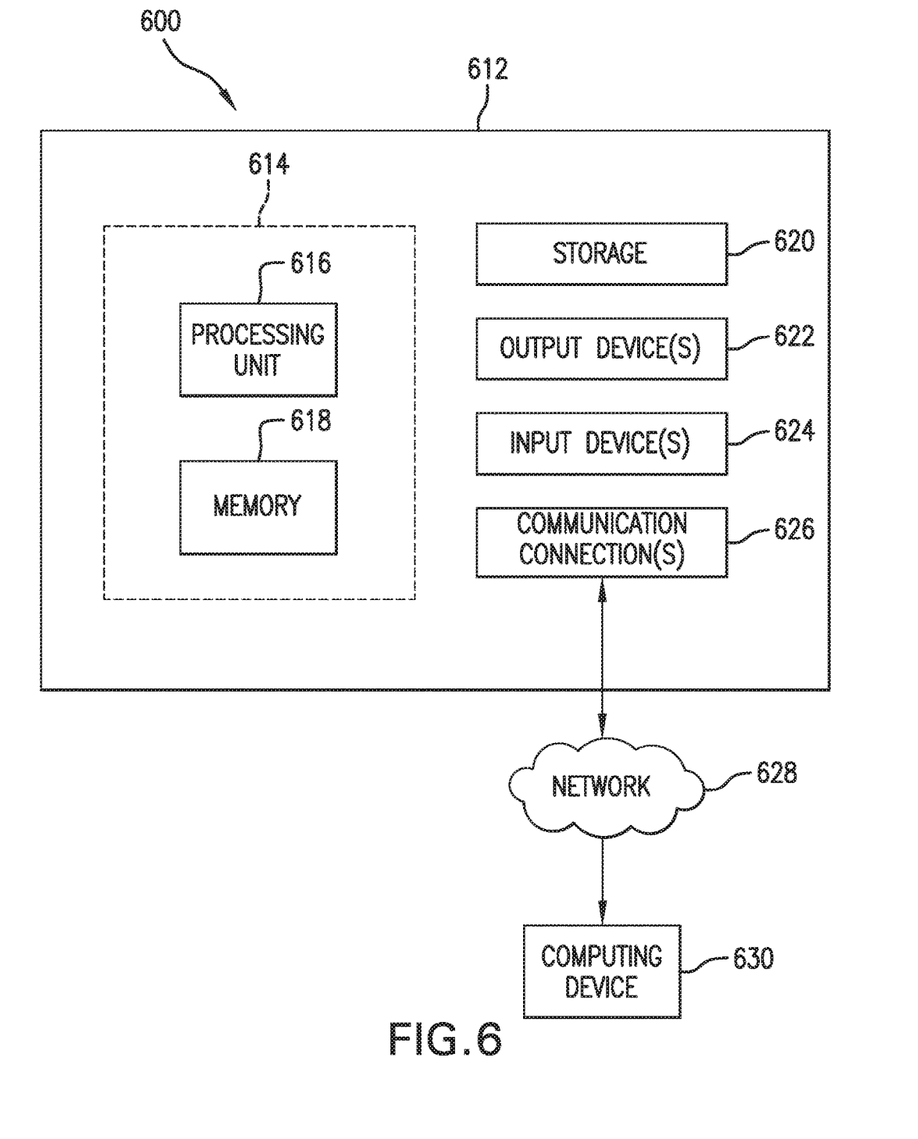
FIG. 6 is an illustration of an example computing environment where one or more of the provisions set forth herein are implemented, according to one or more embodiments.

FIG. 6 and the following discussion provide a description of a suitable computing environment to implement embodiments of one or more of the provisions set forth herein. The operating environment of FIG. 6 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, programmable logic controllers (PLC), distributed computing environments that include any of the above systems or devices, etc.

Generally, embodiments are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 6 illustrates a system 600 including a computing device 612 configured to implement one or more embodiments provided herein. In one configuration, computing device 612 includes at least one processing unit 616 and memory 618. Depending on the exact configuration and type of computing device, memory 618 may be volatile, such as RAM, non-volatile, such as ROM, flash memory, etc., or a combination of the two. This configuration is illustrated in FIG. 6 by dashed line 614.

In other embodiments, device 612 includes additional features or functionality. For example, device 612 may include additional storage such as removable storage or non-removable storage, including, but not limited to, magnetic storage, optical storage, etc. Such additional storage is illustrated in FIG. 6 by storage 620. In one or more embodiments, computer readable instructions to implement one or more embodiments provided herein are in storage 620. Storage 620 may store other computer readable instructions to implement an operating system, an application program, etc. Computer readable instructions may be loaded in memory 618 for execution by processing unit 616, for example.

The term "computer readable media" as used herein includes computer storage media. Computer storage media includes volatile and nonvolatile, removable and non-removable media implemented in any method or technology for storage of information such as computer readable instructions or other data. Memory 618 and storage 620 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by device 612. Any such computer storage media is part of device 612.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Device 612 includes input device(s) 624 such as keyboard, mouse, pen, voice input device, touch input device, infrared cameras, video input devices, or any other input device. Output device(s) 622 such as one or more displays, speakers, printers, or any other output device may be included with device 612. Input device(s) 624 and output device(s) 622 may be connected to device 612 via a wired connection, wireless connection, or any combination thereof. In one or more embodiments, an input device or an output device from another computing device may be used as input device(s) 624 or output device(s) 622 for computing device 612. Device 612 may include communication connection(s) 626 to facilitate communications with one or more other devices 630, such as through network 628, for example.

Although the subject matter has been described in language specific to structural features or methodological acts, it is to be understood that the subject matter of the appended claims is not necessarily limited to the specific features or acts described above. Rather, the specific features and acts described above are disclosed as example embodiments.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system for hydrogen fueling with integrity checks, comprising:
  a communication component receiving one or more communicated parameters at one or more time intervals, wherein one or more of the communicated parameters relates to a compressed hydrogen storage system (CHSS) tank of a vehicle to be fueled with hydrogen fuel;

a calculation component calculating one or more calculated parameters related to the CHSS tank of the vehicle based on:
  a mass of hydrogen fuel dispensed by a hydrogen fueling station from a reference point to one or more of the time intervals; and
  one or more densities of the CHSS tank of the vehicle at one or more of the time intervals;

an error component calculating a tank volume error based on one or more of the communicated parameters and one or more of the calculated parameters at one or more of the time intervals;

a controller determining one or more fueling modes for the hydrogen fueling station based on the tank volume error and implementing a fall forward ramp rate equation or a fall back ramp rate equation based on a change in fueling modes; and dispensing the hydrogen fuel based on one or more of the determined fueling modes and the implemented fall forward or fall back ramp rate equation, wherein the controller implementing the fall forward ramp rate equation accounts for a slower portion of fueling by setting a ramp rate greater than a predetermined average pressure ramp rate (APRR).

2. The system of claim 1, wherein one or more of the communicated parameters is a communicated tank volume.

3. The system of claim 1, wherein one or more of the calculated parameters is a calculated tank volume.

4. The system of claim 1, wherein the controller determines a conservative fueling mode based on the tank volume error being greater than a tank volume error threshold.

5. The system of claim 4, wherein the conservative fueling mode is a mode where the hydrogen fuel is dispensed by the hydrogen fueling station according to a predetermined conservative fill time or a predetermined conservative average pressure ramp rate (APRR).

6. The system of claim 1, wherein the controller determines a communication fueling mode based on the tank volume error being less than or equal to a tank volume error threshold.

7. The system of claim 6, wherein the communication fueling mode is a mode where the hydrogen fuel is dispensed by the hydrogen fueling station according to one or more of the calculated parameters.

8. The system of claim 1, wherein the controller implements the fall forward ramp rate equation based on a change from a conservative fueling mode to a communication fueling mode.

9. The system of claim 1, wherein the controller implements the fall back ramp rate equation based on a change from a communication fueling mode to a conservative fueling mode.

10. The system of claim 1, wherein the communication component includes an Infrared Data Association (IRDA) interface.

11. A method for hydrogen fueling with integrity checks, comprising:
  receiving one or more communicated parameters at one or more time intervals, wherein one or more of the communicated parameters relates to a compressed hydrogen storage system (CHSS) tank of a vehicle to be fueled with hydrogen fuel;
  calculating one or more calculated parameters related to the CHSS tank of the vehicle based on:
    a mass of hydrogen fuel dispensed by a hydrogen fueling station from a reference point to one or more of the time intervals; and
    one or more densities of the CHSS tank of the vehicle at one or more of the time intervals;
  calculating a tank volume error based on one or more of the communicated parameters and one or more of the calculated parameters at one or more of the time intervals;
  determining one or more fueling modes for the hydrogen fueling station based on the tank volume error and implementing a fall forward ramp rate equation or a fall back ramp rate equation based on a change in fueling modes; and
  dispensing the hydrogen fuel based on one or more of the determined fueling modes and the implemented fall forward or fall back ramp rate equation,
  wherein implementing the fall forward ramp rate equation includes accounting for a slower portion of fueling by setting a ramp rate greater than a predetermined average pressure ramp rate (APRR).

12. The method of claim 11, comprising determining a conservative fueling mode based on the tank volume error being greater than a tank volume error threshold.

13. The method of claim 12, wherein the conservative fueling mode is a mode where the hydrogen fuel is dispensed by the hydrogen fueling station according to a predetermined conservative fill time or a predetermined conservative average pressure ramp rate (APRR).

14. The method of claim 11, comprising determining a communication fueling mode based on the tank volume error being less than or equal to a tank volume error threshold.

15. The method of claim 14, wherein the communication fueling mode is a mode where the hydrogen fuel is dispensed by the hydrogen fueling station according to one or more of the calculated parameters.

16. The method of claim 11, comprising dispensing the hydrogen fuel based on the fall forward ramp rate equation when a change from a conservative fueling mode to a communication fueling mode occurs.

17. The method of claim 11, comprising dispensing the hydrogen fuel based on the fall back ramp rate equation when a change from a communication fueling mode to a conservative fueling mode occurs.

18. A system for hydrogen fueling with integrity checks, comprising:
  a communication component receiving one or more communicated parameters at one or more time intervals, wherein one or more of the communicated parameters relates to a compressed hydrogen storage system (CHSS) tank of a vehicle to be fueled with hydrogen fuel;
  a calculation component calculating one or more calculated parameters related to the CHSS tank of the vehicle based on:
    a mass of hydrogen fuel dispensed by a hydrogen fueling station from a reference point to one or more of the time intervals; and
    one or more densities of the CHSS tank of the vehicle at one or more of the time intervals;
  an error component calculating a tank volume error based on one or more of the communicated parameters and one or more of the calculated parameters at one or more of the time intervals;
  a controller determining a conservative fueling mode or a non-conservative fueling mode for the hydrogen fueling station based on the tank volume error and implementing a fall forward ramp rate equation or a fall back ramp rate equation based on a change in fueling modes; and dispensing the hydrogen fuel based on the fall back ramp rate equation or the fall forward ramp rate equation associated with one or more of the determined fueling modes, wherein the controller implementing the fall forward ramp rate equation accounts for a slower portion of fueling by setting a ramp rate greater than a predetermined average pressure ramp rate (APRR).

* * * * *